Oct. 17, 1967 I. R. MARCUS ETAL 3,348,072
LOW-VOLTAGE WIDE-RANGE COMPARATOR AND RECTIFIER USING A PLURALITY OF EMITTER-FOLLOWER CIRCUITS WITH THE COLLECTOR CURRENT OF THE CONDUCTING EMITTER-FOLLOWER MAINTAINED CONSTANT
Filed May 26, 1965
2 Sheets-Sheet 1
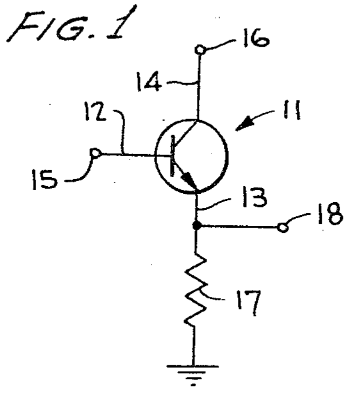
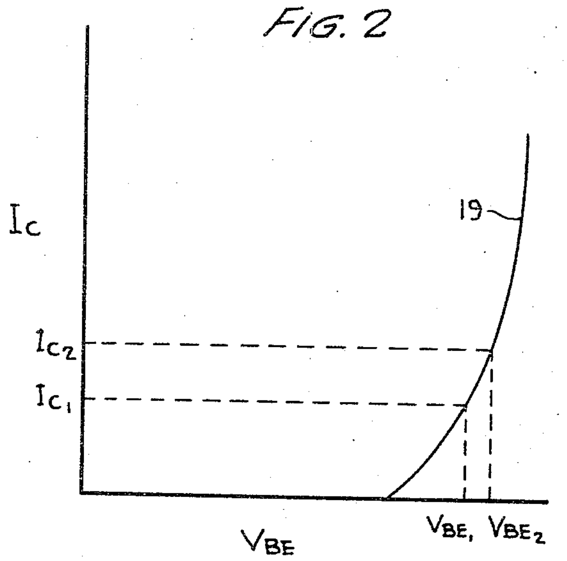
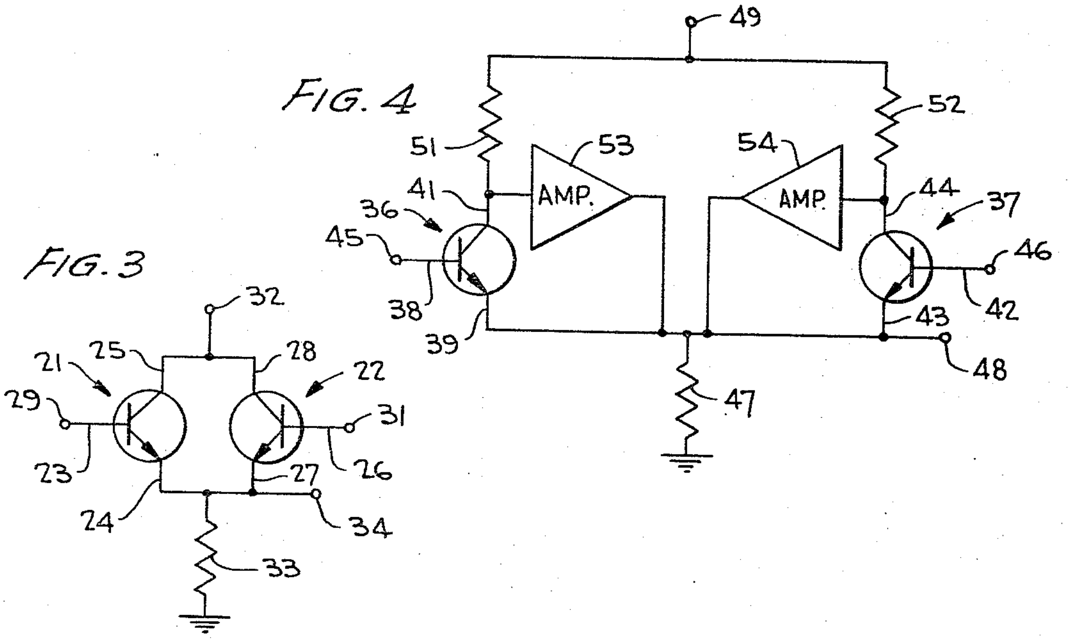
FIG. 4, FIG. 3
INVENTORS,
IRA R. MARCUS
JOSEPH W. MILLER
BY Harry M. Saragovitz, Edward J. Kelly, Herbert Berl, & Charles J. Whitham
ATTORNEYS LOW-VOLTAGE WIDE-RANGE COMPARATOR AND RECTIFIER USING A PLURALITY OF EMITTER-FOLLOWER CIRCUITS WITH THE COLLECTOR CURRENT OF THE CONDUCTING EMITTER-FOLLOWER MAINTAINED CONSTANT Filed May 26, 1965 2 Sheets-Sheet 2

INVENTORS,
IRA R. MARCUS
JOSEPH W. MILLER
BY Harry M. Saragovitz, Edward J. Kelly, Herbert Berl, & Charles S. Whitham ATTORNEYS United States Patent Office 3,348,072

Patented Oct. 17, 1967

3,348,072

LOW-VOLTAGE WIDE-RANGE COMPARATOR AND RECTIFIER USING A PLURALITY OF EMITTER-FOLLOWER CIRCUITS WITH THE COLLECTOR CURRENT OF THE CONDUCTING EMITTER-FOLLOWER MAINTAINED CONSTANT

Ira R. Marcus, Wheaton, Md., and Joseph W. Miller, Washington, D.C., assignors to the United States of America as represented by the Secretary of the Army Filed May 26, 1965, Ser. No. 459,134
8 Claims. (Cl. 307—88.5)

ABSTRACT OF THE DISCLOSURE

A comparator comprising two or more emitter followers, the number being determined by the number of input voltages to be compared, with the emitter followers having a common emitter resistor is described. The input voltage having the highest voltage will appear at an output terminal connected to the emitter resistor because the other emitter followers with lower inputs will be cut off by the high voltage appearing across the emitter resistor. The output voltage error produced by the voltage drop across the base-emitter junction of the conducting transistor is substantially reduced by connecting a current amplifier between the collector and emitter of the emitter follower thereby maintaining a constant collector current in the conducting emitter follower.

The invention described herein may be manufactured and used by or for the Government of the United States of America for governmental purposes without the payment to us of any royalty thereon.

This invention relates to voltage rectifiers and more particularly to a circuit for comparing several simultaneous input voltages and selecting as an output the highest input at any given time.

In many control systems and instrumentation systems it is often desirable to select a voltage from several input sensors which is the largest voltage. Most sensors, however, produce a very wide dynamic range of output voltage at low power. This range of voltage may be as low as a few millivolts to as high as a few volts. Conventional diode rectifiers are limited to signals above hundreds of millivolts. As a result, in order to utilize conventional diode rectifiers, it is necessary to employ an initial stage of amplification. This, however, is often not desirable for reasons of weight and noise.

It is therefore an object of this invention to provide a novel voltage rectifier which is capable of rectifying voltages over a wide dynamic range.

It is another object of this invention to provide a circuit for comparing several simultaneous input voltages and selecting as an output voltage the highest input at any time wherein the input voltages may vary from a few millivolts to several volts.

According to the present invention, these and other objects are obtained by providing a plurality of emitter follower circuits, the number corresponding to the number of input voltages to be compared, all of the emitter followers being connected to a common load resistance, and means connected to each of the emitter follower circuits for maintaining the collector current constant of the particular emitter follower which is conducting.

The specific nature of the invention, as well as other objects, aspects, uses and advantages thereof, will clearly appear from the following description and from the accompanying drawing, in which:

FIGURE 1 is a schematic diagram of an NPN transistor connected as an emitter follower;

FIGURE 2 is a graph illustrating the property of the base to emitter junction of the transistor in FIGURE 1 with respect to collector current;

FIGURE 3 is a schematic diagram of a comparator composed of two emitter followers;

FIGURE 4 illustrates a schematic diagram of the circuit designed to overcome the limitations of the circuit shown in FIGURE 3;

Figure 5:
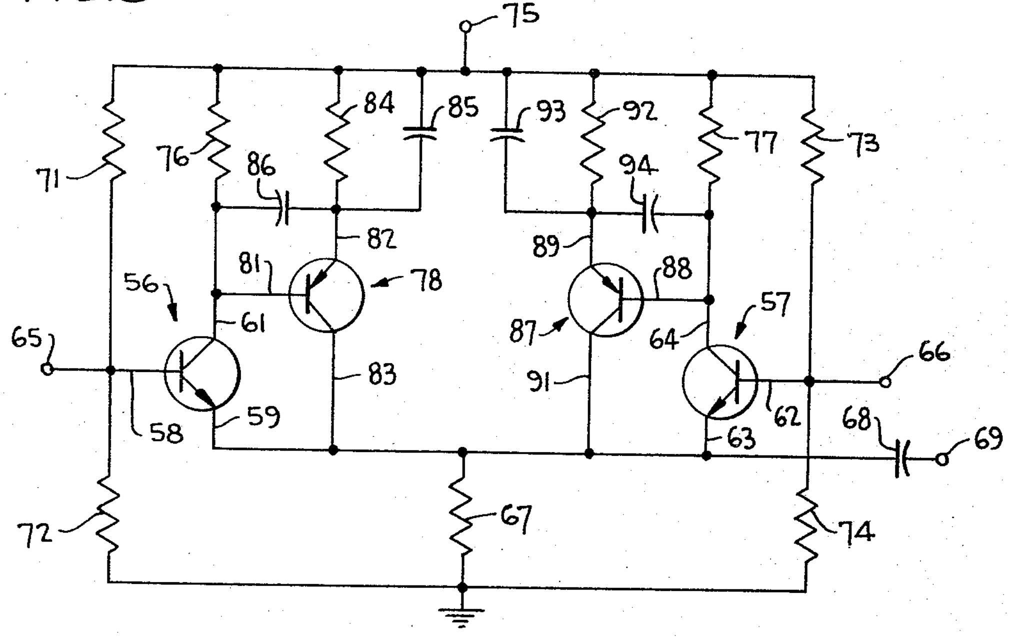
FIGURE 5 shows a complete schematic diagram of the circuit shown in FIGURE 4.

Referring now to the drawings and more particularly to FIGURE 1 which shows a conventional emitter follower comprising an NPN transistor 11 having a base 12, an emitter 13 and a collector 14, the input to the emitter follower is supplied to the base 12 by way of terminal 15. A source of supply voltage is connected to the collector 14 at terminal 16. The emitter is connected to a load resistor 17, and the output from the emitter follower is taken across the load resistor 17 at terminal 18.

As shown in FIGURE 2, the output of the emitter follower is similar to the input except for the voltage drop across the base to emitter junction, $V_{BE}$. However, because the curve is not linear, the output will not be identical to the input voltage. For example, if the quiescent point of the transistor was at a collector current $I_{C1}$ and an AC input voltage V appeared across the input causing the collector current to change to $I_{C2}$, then the output AC voltage would not be V but would be $$V-(V_{BE2}-V_{BE1})$$

where $V_{BE1}$ is the quiescent base-emitter voltage drop produced by $I_{C1}$ and $V_{BE2}$ is the voltage drop across the base-emitter junction produced by the increased collector current, $I_{C2}$ caused by input voltage V. The voltage change across the base-emitter junction will result in a loss in output signal as compared to the input signal in an emitter follower obviously an undesirable characteristic. Thus it is seen that the emitter follower shown in FIGURE 1 is not a perfect follower, particularly at low collector currents.

FIGURE 3 shows a comparator composed of two emitter followers having a common load resistance. Specifically, the comparator comprises a first transistor NPN 21 having a base 23, an emitter 24, and a collector 25, and a second NPN transistor 22 having a base 26, an emitter 27, and a collector 28. A first input is connected to the base 23 of transistor 21 at terminal 29 while a second input is connected to base 26 of transistor 22 at terminal 31. A common supply voltage is connected to collectors 25 and 28 at terminal 32. The emitters 24 and 27 are both connected to a common load resistance 33, and the output is taken across load resistance 33 at terminal 34. As is well known, the highest voltage input appears at the output. For example, if a higher voltage appeared at terminal 29 than appeared at terminal 31, transistor 21 would be made to conduct. The voltage appearing at emitter 24 would be approximately equal to the input voltage at terminal 29. Since this voltage also appears at emitter 27 and is larger than the input voltage at terminal 31, transistor 22 would be cut off. The input voltage at terminal 29 then substantially appears at output terminal 34. However, the value of the output voltage is less than the input voltage due to the increased voltage drop across the base to emitter junction as previously described with respect to FIGURES 1 and 2. The error is now much greater than in the case of the simple emitter follower since the greater conducting transistor, in this case transistor 21, must supply the current formerly supplied by the other transistor, or transistor 22. For example, if both transistors 21 and 22 were conducting one milliamp of current and the input to transistor 21 is greater than the input to transistor 22 by about two-tenths of a volt, transistor 22 is turned off and transistor 21 must supply the one milliamp quiescent current formerly supplied by transistor 22. Thus the circuit shown in FIGURE 3 is not a very good comparator.

FIGURE 4 shows a circuit according to this invention which is designed to overcome the difficulties encountered with the circuit shown in FIGURE 3. This circuit includes a first transistor 36 having a base 38, an emitter 39, and a collector 41, and a second transistor 37 having a base 42, an emitter 43, and a collector 44. A first input is connected to base 38 of transistor 36 at terminal 45, while a second input is connected to base 42 of transistor 37 at terminal 46. The emitters 39 and 43 are connected to a common load resistance 47. The output is taken across the load resistance 47 at terminal 48. The collectors 41 and 44 are connected to a source of supply voltage at terminal 49 through resistors 51 and 52, respectively. The resistor 51 is a bias resistor for amplifier 53, and the resistor 52 is a bias resistor for amplifier 54. Current amplifiers 53 and 54 have their inputs connected to the bias resistors 51 and 52, respectively, and their outputs connected to the common emitter junction of transistors 36 and 37. The purpose of current amplifiers 53 and 54, the operation of which will be more fully explained below in the description of FIGURE 5, is to maintain the collector current of the conducting transistor constant. This is accomplished by rendering amplifier 53 or 54 conductive when an increase in collector current in the transistor with which the amplifier is associated is noticed. In so doing, the voltage difference $V_{BE2}-V_{BE1}$ shown in FIGURE 2 will be negligible. This will insure that the input voltage is truly reproduced at the output. Any attempt to increase the collector current through either resistor 51 or 52, depending which of transistors 36 or 37 is conducting, causes the respective amplifier 53 or 54 to supply the required current to appear at the common emitter junction.

FIGURE 5 shows a complete schematic diagram of the circuit shown in FIGURE 4. This circuit includes a first NPN transistor 56 having a base 58, an emitter 59, and a collector 61, and a second NPN transistor having a base 62, an emitter 63, and a collector 64. A first input is connected to the base 58 of NPN transistor 56 at terminal 65, while a second input is connected to base 62 of NPN transistor 57 at terminal 66. The emitters 59 and 63 of NPN transistors 56 and 57, respectively, are connected to a common load resistance 67. The AC output voltage developed across load resistance 67 is coupled through coupling capacitor 68 to the output terminal 69. Resistors 71 and 72 form a first voltage divider connected between a source of positive potential connected to terminal 75 and ground. The base 58 of transistor 56 is connected to this first voltage divider which establishes a DC operating potential that biases the transistor 56 into conduction. Resistors 73 and 74 form a second voltage divdier connected between the source of positive potential connected to terminal 75 and ground. The base 62 of the transistor 57 is connected to this second voltage divider which establishes a DC operating potential that biases transistor 57 into conduction. The collectors 61 and 64 of transistors 56 and 57 are connected to the source of positive potential at terminal 75 by way of resistors 76 and 77, respectively. The first current amplifier comprises a PNP transistor 78 having a base 81, an emitter 82, and a collector 83. The base 81 of PNP transistor 78 is connected to the bias resistor 76. The collector 83 of PNP transistor 78 is connected to the common emitter junction of NPN transistors 56 and 57. The emitter 82 of PNP transistor 78 is connected to the source of positive potential at terminal 75 by way of resistor 84. Connected across resistor 84 is capacitor 85 which serves as an AC bypass capacitor. Resistor 84 and the bias resistor 76 establish the DC operating point of transistor 78 and causes transistor 78 to be biased into conduction. The AC bypass capacitor 85 prevents feedback through resistor 84 of the current amplifier thereby permitting high-gain operation. A capacitor 86 is connected between the emitter 82 of PNP transistor 78 and the base 81 on the same transistor. This capacitor 86 serves to prevent oscillation of the current amplifier. The second current amplifier comprises a PNP transistor 87 having a base 88, an emitter 89, and a collector 91. The base 88 of PNP transistor 87 is connected to the bias resistor 77. The collector 91 of PNP transistor 87 is connected to the common emitter junction of NPN transistors 56 and 57. The emitter 89 of PNP transistor 87 is connected to the source of positive potential at terminal 75 by way of resistor 92. Connected across resistor 92 is an AC bypass capacitor 93. The resistor 92 and the bias resistor 77 establishes the DC operating point of PNP transistor 87 and causes the transistor to be biased into conduction. Connected between emitter 89 and base 88 of PNP transistor 87 is a capacitor 94 which serves to prevent oscillations of the current amplifier.

As has been explained, all the transistors 56, 57, 78 and 87 are biased into conduction. This is necessary because the circuit must be responsive to input signals in the millivolt range. Assume now that a positive input voltage appears at input terminal 65. This voltage will cause the collector current of NPN transistor 56 to tend to increase. When this happens, the voltage at base 81 of PNP transistor 78 tends to decrease. This in turn causes the current conducted by PNP transistor 78 to increase. Thus, by shunting the increased collector current produced by the input voltage at terminal 65 through transistor 78 the collector current of NPN transistor is maintained constant, and the input voltage appearing at input terminal 65 is truly reproduced at emitter 59 whether or not the input voltage is a few volts or a few millivolts. If there is simultaneously applied to input terminal 66 a second input voltage but of less magnitude than the input voltage applied to input terminal 65, the voltage appearing at emitter 59 will cause the base to emitter junction of transistor 57 to be back biased, thus preventing the input voltage at terminal 66 from appearing at the emitter 63 of NPN transistor 57.

While the comparator according to the invention as described with reference to FIGURES 4 and 5 compares only two input voltages, the circuit is capable of comparing a multiplicity of input voltages. It is only necessary that an emitter follower and a current amplifier be supplied for each input voltage to be compared. Comparison of a large number of input voltages is not possible with the simple comparator circuit shown in FIGURE 3. This is because the error described with reference to FIGURES 1 and 2 is cumulative.

Figure 6:
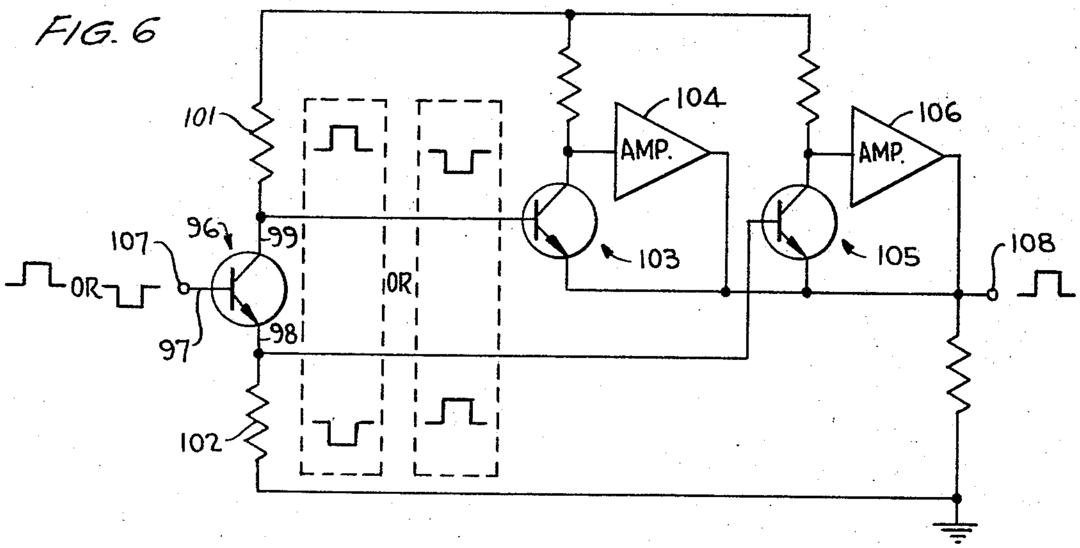
FIGURE 6 illustrates schematically how the circuit in FIGURES 4 and 5 may be used as a pulse rectifier.

As shown in FIGURE 6, the comparing circuit according to the invention may be combined with a phase-splitter to form a pulse rectifier. More particularly, the phase-splitter comprises a transistor 96 having a base 97, an emitter 98, and a collector 99. The collector 99 and the emitter 98 are connected to balanced load resistances 101 and 102, respectively. Transistor 103, connected as an emitter follower, and current amplifier 104 along with transistor 105, also connected as an emitter follower, and current amplifier 106 form the comparator according to the invention as described with reference to FIGURE 4. The base of transistor 103 is connected to collector 99 of phase-splitting transistor 96 while the base of transistor 105 is connected to the emitter 98 of phase-splitting transistor 97. An input pulse is applied at the input terminal 107 which is connected to base 97, and as shown in FIGURE 6, the input pulse may be either positive or negative. The outputs of the phase-splitting transistor 96 appearing at collector 99 and emitter 98 may be either a positive and a negative pulse or a negative and a positive pulse, depending on whether the input pulse is positive or negative. The output at terminal 108 of the comparator circuit will be the positive pulse of the pulse pair supplied to the bases of transistors 103 and 105. If the input voltage to terminal 107 were a continuous AC wave instead of a pulse, the output from the comparator is a full wave rectified output. As before, this circuit is operable for input voltages from a few millivolts to a few volts.

It will be apparent that the embodiment shown is only exemplary and that various modifications can be made in construction and arrangement within the scope of the invention as defined in the appended claims.

We claim as our invention:

1. A low-voltage, wide-range comparator comprising:
(a) a first transistor having a base, an emitter, and a collector,
(b) a second transistor having a base, an emitter, and a collector,
(c) a common load resistance connected to the emitters of said first and second transistors,
(d) a first resistor connected to the collector of said first transistor and to a source of supply voltage,
(e) a second resistor connected to the collector of said second transistor and to a source of supply voltage,
(f) a first current amplifier having its input connected to the collector of said first transistor and its output connected to the common emitter junction of said first and second transistors, said first resistor serves to establish the operating point of said first current amplifier, and
(g) a second current amplifier having its input connected to the collector of said second transistor and its output connected to the common emitter junction of said first and second transistors, said second resistor serves to establish the operating point of said second current amplifier.

2. A low-voltage, wide-range rectifier comprising:
(a) a low-voltage, wide-range comparator as recited in claim 1, and
(b) a phase-splitter having one input and a first and a second output, said first output being connected to the base of said first transistor, and said second output being connected to the base of said second transistor.

3. A low-voltage, wide-range comparator as recited in claim 1 wherein said first and second current amplifiers respectively comprise:
(a) a third transistor having a base, an emitter, and a collector, the base of said third transistor being connected to the collector of said first transistor, the collector of said third transistor being connected to the common emitter junction of said first and second transistors and the emitter of said third transistor being connected to a source of supply voltage, and
(b) a fourth transistor having a base, an emitter, and a collector, the base of said fourth transistor being connected to the collector of said second transistor, the collector of said fourth transistor being connected to the common emitter junction of said first and second transistors, and the emitter of said fourth transistor being connected to a source of supply voltage.

4. A low-voltage, wide-range rectifier comprising:
(a) a low-voltage, wide-range comparator as recited in claim 3, and
(b) a phase-splitter having an input and first and second outputs, said first output of said phase-splitter being connected to the base of said first transistor and said second output of said phase-splitter being connected to the base of said second transistor.

5. A low-voltage, wide-range comparator as recited in claim 3 further comprising:
(a) a third resistor connected between the emitter of said third transistor and a source of supply voltage, said third resistor and said first resistor establishing a DC operating point for said third transistor that biases said third transistor on,
(b) a fourth resistor connected between the emitter of said fourth transistor and a source of supply voltage, said fourth transistor and said second resistor establishing a DC operating point for said fourth transistor biasing said fourth transistor into conduction,
(c) a first bypass capacitor connected across said third resistor to prevent feedback through said third resistor,
(d) a second bypass capacitor connected across said fourth resistor to prevent feedback to said fourth resistor,
(e) a fifth resistor and a sixth resistor connected in series across a source of supply voltage to form a first voltage divider, the base of said first transistor being connected to the junction of said fifth and said sixth resistors, said first voltage divider establishing a DC operating point for said first transistor that biases said first transistor on, and
(f) a seventh resistor and an eighth resistor connected in series across a source of supply voltage to form a second voltage divider, the base of said second transistor being connected to the junction of said seventh and said eighth resistors, said second voltage divider serving to establish a DC operating point for said second transistor that biases said second transistor on.

6. A low-voltage, wide-range rectifier comprising:
(a) a low-voltage, wide-range comparator as recited in claim 5, and
(b) a phase-splitter having an input and a first and a second output, said first output of said phase-splitter being connected to the base of said first transistor and said second output of said phase-splitter being connected to the base of said second transistor.

7. A low-voltage, wide-range comparator as recited in claim 5 wherein said first and said second transistors are NPN transistors and said third and fourth transistors are PNP transistors and further comprising:
(a) a third capacitor connected between the emitter and the base of said third transistor, and
(b) a fourth capacitor connected between the emitter and the base of said fourth transistor, said third and fourth capacitors serving to prevent oscillations of said first and second current amplifiers, respectively.

8. A low-voltage, wide-range rectifier comprising:
(a) a low-voltage, wide-range comparator as recited in claim 7, and
(b) a phase-splitter having an input and first and second outputs, said first output being connected to the base of said first transistor, and said second output being connected to the base of said second transistor.

References Cited

UNITED STATES PATENTS

| | | | |
|---|---|---|---|
| 2,892,940 | 6/1959 | Ogletree | 328—146 |
| 3,181,008 | 4/1965 | Huckins | 328—146 XR |

ARTHUR GAUSS, *Primary Examiner.*

J. JORDAN, *Assistant Examiner.*